US012573381B2

(12) United States Patent
Xue et al.

(10) Patent No.: US 12,573,381 B2
(45) Date of Patent: Mar. 10, 2026

(54) SPEECH RECOGNITION METHOD AND APPARATUS, STORAGE MEDIUM, AND ELECTRONIC DEVICE

(71) Applicants: BEIJING WODONG TIANJUN INFORMATION TECHNOLOGY CO., LTD., Beijing (CN); BEIJING JINGDONG CENTURY TRADING CO., LTD., Beijing (CN)

(72) Inventors: Wei Xue, Beijing (CN); Yuyu Cai, Beijing (CN); Junyi Wu, Beijing (CN); Yi Peng, Beijing (CN); Lu Fan, Beijing (CN); Fan Yang, Beijing (CN); Guohong Ding, Beijing (CN); Xiaodong He, Beijing (CN)

(73) Assignees: Beijing Wodong Tianjun Information Technology Co., Ltd., Beijing (CN); BEIJING JINGDONG CENTURY TRADING CO., LTD., Beijing (CN)

( * ) Notice: Subject to any disclaimer, the term of this patent is extended or adjusted under 35 U.S.C. 154(b) by 272 days.

(21) Appl. No.: 18/258,569

(22) PCT Filed: Dec. 14, 2021

(86) PCT No.: PCT/CN2021/137969
§ 371 (c)(1),
(2) Date: Jun. 21, 2023

(87) PCT Pub. No.: WO2022/151893
PCT Pub. Date: Jul. 21, 2022

(65) Prior Publication Data
US 2024/0046919 A1 Feb. 8, 2024

(30) Foreign Application Priority Data
Jan. 18, 2021 (CN) .......................... 202110062350.0

(51) Int. Cl.
*G10L 15/08* (2006.01)
*G10L 15/02* (2006.01)
*G10L 15/04* (2013.01)

(52) U.S. Cl.
CPC .............. *G10L 15/08* (2013.01); *G10L 15/02* (2013.01); *G10L 15/04* (2013.01)

(58) Field of Classification Search
CPC ......... G10L 15/08; G10L 15/02; G10L 15/04; G10L 15/063; G10L 15/22; G10L 15/26
See application file for complete search history.

(56) References Cited

U.S. PATENT DOCUMENTS

| | | | |
|---|---|---|---|
| 6,799,162 | B1 | 9/2004 | Goronzy et al. |
| 10,304,440 | B1 | 5/2019 | Panchapagesan et al. |

(Continued)

FOREIGN PATENT DOCUMENTS

| | | |
|---|---|---|
| CN | 103514170 A | 1/2014 |
| CN | 104200804 A | 12/2014 |

(Continued)

OTHER PUBLICATIONS

Wu Bin, "Post-Processing Technique For Speech Recognition", Mar. 15, 2010.

(Continued)

*Primary Examiner* — Bhavesh M Mehta
*Assistant Examiner* — Jangwoen Lee
(74) *Attorney, Agent, or Firm* — Qinghong Xu

(57) ABSTRACT

Provided are a speech recognition method, a speech recognition apparatus, a computer readable storage medium, and an electronic device. The method comprises: obtaining a sample speech signal, decoding the sample speech signal, obtaining a decoding result, and extracting a first feature from the decoding result; extracting a target speech segment from the sample speech signal, obtaining a log magnitude (Continued)

spectrum of the target speech segment, and determining a second feature according to the log magnitude spectrum; combining the first feature and the second feature to obtain a third feature; training an untrained classifier by using the third feature so as to obtain a trained classifier; and obtaining a third feature to be recognized of a speech signal to be recognized, so as to determine whether the third feature to be recognized comprises a prepositive word.

20 Claims, 5 Drawing Sheets

(56)               References Cited

U.S. PATENT DOCUMENTS

| | | | |
|---|---|---|---|
| 2010/0280827 A1* | 11/2010 | Mukerjee | G10L 25/93 |
| | | | 704/236 |
| 2014/0012580 A1 | 1/2014 | Ganong, III et al. | |
| 2018/0211652 A1* | 7/2018 | Mun | G10L 15/187 |
| 2018/0350346 A1 | 12/2018 | Chen et al. | |
| 2019/0189111 A1 | 6/2019 | Watanabe et al. | |
| 2019/0221206 A1 | 7/2019 | Chen et al. | |
| 2020/0312309 A1* | 10/2020 | Lin | G06N 3/0464 |
| 2022/0020361 A1* | 1/2022 | Wintrode | G10L 15/16 |
| 2022/0246162 A1* | 8/2022 | Liang | G10L 21/0316 |

FOREIGN PATENT DOCUMENTS

| | | |
|---|---|---|
| CN | 105741838 A | 7/2016 |
| CN | 106409298 A | 2/2017 |
| CN | 106469552 A | 3/2017 |
| CN | 107346659 A | 11/2017 |
| CN | 108564941 A | 9/2018 |
| CN | 109313902 A | 2/2019 |
| CN | 110060693 A | 7/2019 |
| CN | 110349564 A | 10/2019 |
| CN | 110473531 A | 11/2019 |
| CN | 110648659 A | 1/2020 |
| CN | 110853618 A | 2/2020 |
| CN | 111613212 A | 9/2020 |
| CN | 111653274 A | 9/2020 |
| CN | 111816165 A | 10/2020 |
| CN | 111833866 A | 10/2020 |
| CN | 112102815 A | 12/2020 |
| CN | 113782005 A | 12/2021 |
| JP | 2007322758 A | 12/2007 |
| WO | 2020073839 A1 | 4/2020 |
| WO | 2020247489 A1 | 12/2020 |

OTHER PUBLICATIONS

Wu Yuhang, "Speech Keyword Matching Model Based On Deep Learning", Jan. 15, 2019.
1st Office Action dated Aug. 29, 2023 of Chinese Application No. 202110062350.0.
Notice of Allowance dated Dec. 15, 2023 of Chinese Application No. 202110062350.0.
1st Office Action dated Apr. 9, 2024 for Japanese Application No. 2023-515648.
International Search Report dated Mar. 9, 2022 of International Application No. PCT/CN2021/137969.

* cited by examiner

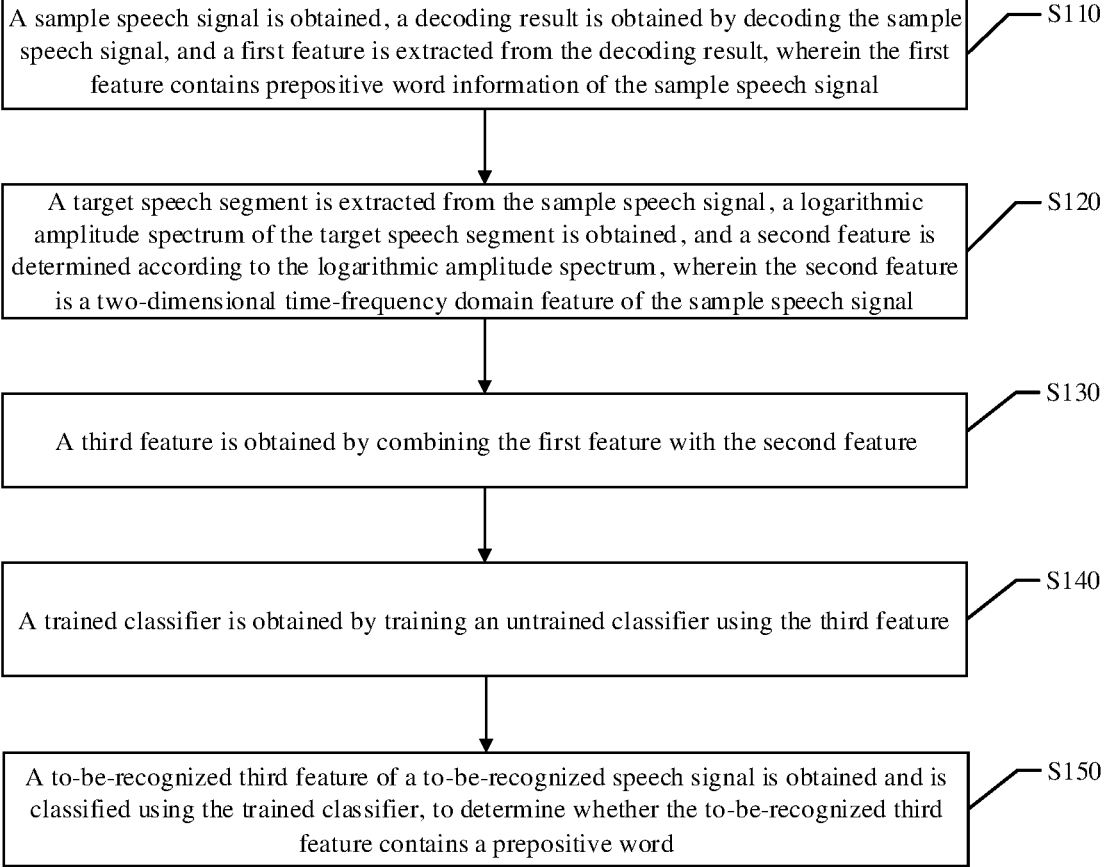

A sample speech signal is obtained, a decoding result is obtained by decoding the sample speech signal, and a first feature is extracted from the decoding result, wherein the first feature contains prepositive word information of the sample speech signal ⟋— S110

A target speech segment is extracted from the sample speech signal, a logarithmic amplitude spectrum of the target speech segment is obtained, and a second feature is determined according to the logarithmic amplitude spectrum, wherein the second feature is a two-dimensional time-frequency domain feature of the sample speech signal ⟋— S120

A third feature is obtained by combining the first feature with the second feature ⟋— S130

A trained classifier is obtained by training an untrained classifier using the third feature ⟋— S140

A to-be-recognized third feature of a to-be-recognized speech signal is obtained and is classified using the trained classifier, to determine whether the to-be-recognized third feature contains a prepositive word ⟋— S150

FIG. 1

SPEECH RECOGNITION METHOD AND APPARATUS, STORAGE MEDIUM, AND ELECTRONIC DEVICE

CROSS REFERENCE TO RELATED APPLICATIONS

This application is a U.S. national phase application of International Application No. PCT/CN2021/137969, filed on Dec. 14, 2021, which claims priority to Chinese Patent Application No. 202110062350.0, filed on Jan. 18, 2021, the entire contents of which are incorporated herein by reference.

TECHNICAL FIELD

The present disclosure relates to the field of speech recognition technology, in particular to a speech recognition method, a speech recognition apparatus, a computer-readable storage medium, and an electronic device.

BACKGROUND

Speech recognition technology is a technology that converts human speech into texts, which has been widely used in various artificial intelligence products, such as intelligent chat robots, intelligent speakers, intelligent translation devices, etc. The speech recognition technology achieves information exchange mainly by way of human-machine conversation.

SUMMARY

According to one aspect of the present disclosure, a speech recognition method is provided, which includes: obtaining a sample speech signal, obtaining a decoding result by decoding the sample speech signal, and extracting a first feature from the decoding result, wherein the first feature contains prepositive word information of the sample speech signal; extracting a target speech segment from the sample speech signal, obtaining a logarithmic amplitude spectrum of the target speech segment, and determining a second feature according to the logarithmic amplitude spectrum, wherein the second feature is a two-dimensional time-frequency domain feature of the sample speech signal; obtaining a third feature by combining the first feature with the second feature; obtaining a trained classifier by training an untrained classifier using the third feature; and obtaining a to-be-recognized third feature of a to-be-recognized speech signal, and classifying the to-be-recognized third feature using the trained classifier, to determine whether the to-be-recognized third feature contains a prepositive word.

According to one aspect of the present disclosure, a speech recognition apparatus is provided, which includes: a first feature acquisition module configured to obtain a sample speech signal, obtain a decoding result by decoding the sample speech signal, and extract a first feature from the decoding result, wherein the first feature contains prepositive word information of the sample speech signal; a second feature acquisition module configured to extract a target speech segment from the sample speech signal, obtain a logarithmic amplitude spectrum of the target speech segment, and determine a second feature according to the logarithmic amplitude spectrum, wherein the second feature is a two-dimensional time-frequency domain feature of the sample speech signal; a third feature acquisition module configured to obtain a third feature by combining the first feature with the second feature; a classifier training module configured to obtain a trained classifier by training an untrained classifier using the third feature; and a classification and recognition module configured to obtain a to-be-recognized third feature of a to-be-recognized speech signal, and classify the to-be-recognized third feature using the trained classifier, to determine whether the to-be-recognized third feature contains a prepositive word.

According to one aspect of the present disclosure, a computer-readable storage medium is provided, on which a computer program is stored, and when the computer program is executed by a processor, cause above speech recognition method to be implemented.

According to one aspect of the present disclosure, an electronic device is provided, which includes a processor; and a memory for storing one or more programs, and when the one or more programs are executed by the processor, above speech recognition method is caused to be implemented by the processor.

It should be understood that above general description and following detailed description are only illustrative and explanatory, and do not limit the present disclosure.

BRIEF DESCRIPTION OF THE DRAWINGS

The drawings, which are incorporated in and constitute a part of this specification, illustrate embodiments consistent with the present disclosure and serve together with the specification to explain principles of the present disclosure. It is apparent that the drawings in the following description are only some embodiments of the present disclosure, and for those of ordinary skill in the art, other drawings can also be obtained from these drawings without creative efforts.

FIG. 1 schematically illustrates a flowchart of a speech recognition method according to exemplary embodiments of the present disclosure;

DETAILED DESCRIPTION

Figure 2:
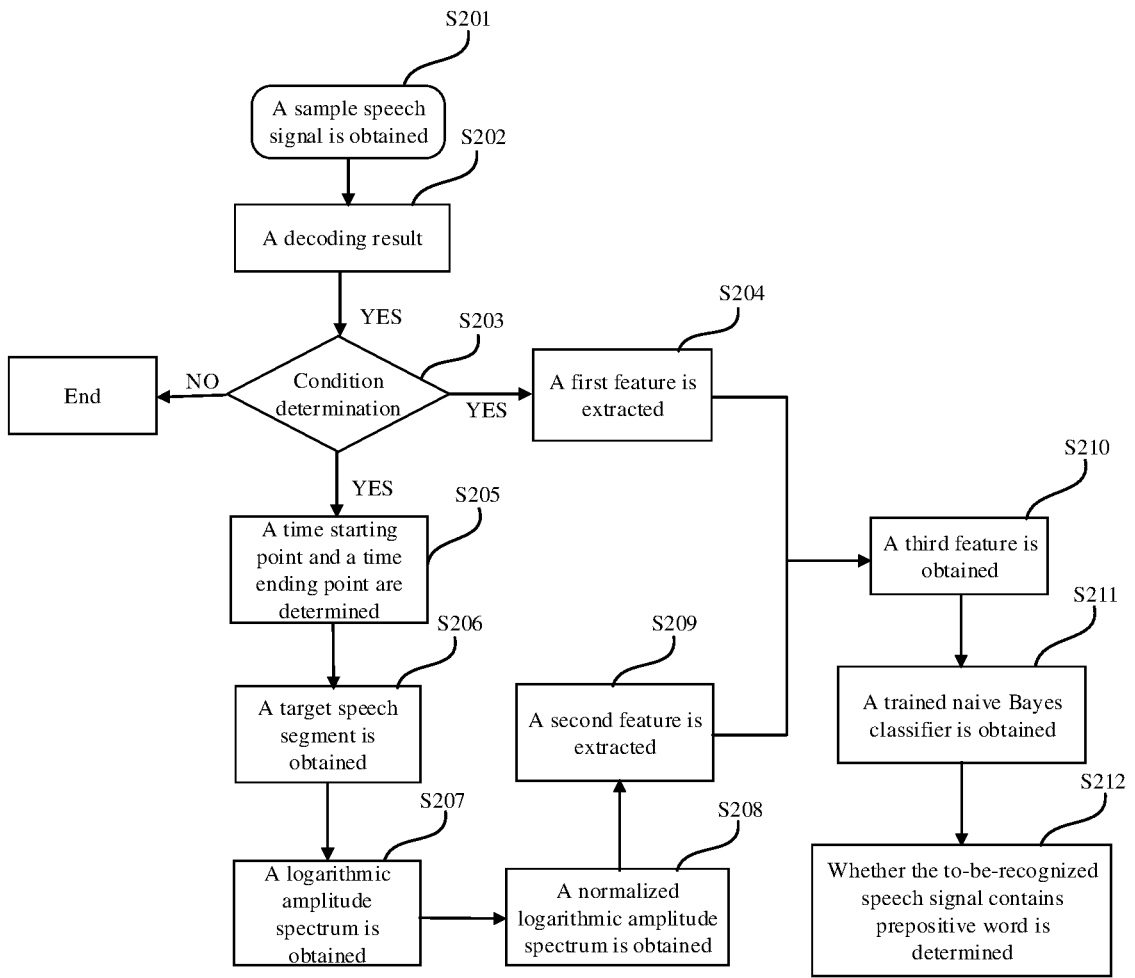
FIG. 2 schematically illustrates a flowchart of steps of a speech recognition method according to exemplary embodiments of the present disclosure.

Example embodiments will now be described more fully with reference to the drawings. Example embodiments, however, can be embodied in a variety of forms and should not be construed as being limited to examples set forth herein. Instead, these embodiments are provided so that the present disclosure will be thorough and complete, and will fully convey concepts of the example embodiments to those skilled in the art. The same reference numerals in the figures denote the same or similar parts, and thus their detailed description will be omitted.

Although relative terms such as "up" and "down" are used in this specification for describing a relative relationship between one component and another component illustrated, these terms are only used for convenience in this specification, such as according to a direction of an example shown in the drawings. It can be understood that if the illustrated device is flipped so that it is upside down, the component described as "up" will become the component described as "down". Other relative terms, such as "high", "low", "top", "bottom", "left", "right", etc., also have similar meanings. When a certain structure is "on" another structure, it may mean that the structure is formed integrally on the other structure, or the structure is arranged "directly" on the other structure, or the structure is arranged "indirectly" on the other structure through a third structure.

Terms "a", "an", and "the" are used to indicate presence of one or more elements/constituent parts/etc. Terms "include" and "have" are used to indicate open inclusion and mean that there may be other elements/constituent parts/etc., in addition to the elements/constituent parts/etc. listed.

The language used by humans for communication usually includes two ways of expression, i.e., speech and text. With the development of information technology, there is also a need for a large amount of information exchange between humans and machines. Currently, computers have begun to be used to simulate a process of human for information exchange.

Specifically, the process of human for information exchange includes: 1. natural language generation, which converts ideas generated by a brain into language; 2. speech synthesis, which converts the language into speech; 3. speech recognition, which recognizes a speech content that expresses the language; 4. natural language understanding, which understands meanings of the language expressed by speech. The first two items are involved in the process executed by a speaker, and the last two items are involved in the process executed by a listener. The speech recognition is a process of "recognizing the speech content that expresses the language" in above processes. The speech recognition is, for devices, to recognize a speech from a human and converts the speech into texts.

The speech recognition is a pattern recognition system, and mainly includes following steps: 1. speech input; 2. pre-processing; 3. feature extraction, which enters training clustering of step 4 and recognition operations of steps 5-7 as two branches, respectively. In some embodiments, step 5 performs similarity comparison by using a reference pattern in a template library to, step 6 performs distortion detection on results of step 5 during the recognition process, which then enters step 7, and step 7 outputs the recognition result.

The pre-processing mentioned above includes processing such as sampling and filtering of speech signals. The feature extraction is used to extract several sets of parameters from the speech signals that can describe signal characteristics, such as energy, resonance peaks, cepstral coefficients, etc., so as to facilitate the training and the recognition. The process of establishing a speech recognition system involves obtaining first the template library by training a large amount of speech, reading then a template in the template library and performing similarity comparison with the speech to be recognized to obtain the recognition result.

An acoustic model and a language model are fundamental to the automatic speech recognition technology in the speech recognition technology. The acoustic model is used to recognize "speech" from the speech signals, while the language model is used to convert the speech into "words". Recognition for large scale non-specific continuous speech relies on large-scale acoustic and text training corpus. In order to achieve good performance, the acoustic model needs, during the training process, to adapt to different types of accents, noises, tone changes, channel transmission compression and distortion, etc., in actual application scenarios. The language model needs to adapt to proper nouns and speech tactics in different fields.

In daily human-machine conversation, users usually indicate their intentions by answering in short words, such as "yes/no", "right/wrong", "buy/not buy", etc. Therefore, the accuracy of recognizing these short words is particularly important.

In the model training corpus used in existing large-scale continuous speech recognition frameworks, the proportion of short words mentioned above is very small, and there is no specific methods for recognizing short words containing such preceding words.

Traditional isolated word recognition or command word recognition techniques are related to short word recognition, which cannot be used in the application scenario such as recognition for large scale non-specific continuous speech due to limited decoding search space adopted in such recognition technology. In a recognition framework for large-scale continuous speech, there is a lack of specific optimization for short word recognition in categories such as "be/be not", "right/not right", "be in/be not in", and "have bought/have not bought". Moreover, the proportion of these short words is relatively small, and the manpower and time costs for re-training models by using large-scale corpus are high, and an improvement effect of recognition is not significant.

Based on above issues, exemplary embodiments of the present disclosure provides a speech recognition method and a speech recognition apparatus, aiming at improving the accuracy of short word recognition that frequently occurs in various business fields and application scenarios. The speech recognition method and the speech recognition apparatus are widely used in various devices, such as mobile phones, computers, etc. Exemplary embodiments do not limit specific devices using embodiments of the present disclosure.

FIG. 1 schematically illustrates a flowchart of a speech recognition method according to exemplary embodiments of the present disclosure. The speech recognition method can include following steps, as shown in FIG. 1.

In step S110, a sample speech signal is obtained, a decoding result is obtained by decoding the sample speech signal, and a first feature is extracted from the decoding result, the first feature herein contains prepositive word information of the sample speech signal.

In exemplary embodiments of the present disclosure, the sample speech signal is a signal sample for training a classifier. The signal sample can be a continuous long speech signal or short speech signal containing a prepositive word, or a continuous long speech signal or short speech signal not containing a prepositive word. When the decoding result contains a prepositive word, the prepositive word information is 1, and when the decoding result does not contain a prepositive word, the prepositive word information is 0.

In actual applications, the prepositive words can be "no", "not", or other words. The speech recognition method provided in exemplary embodiments of the present disclosure can be used to recognize short words containing any type of the prepositive words. Therefore, exemplary embodiments disclosed in the present disclosure do not impose any special limitations on specific prepositive words.

In exemplary embodiments of the present disclosure, in the process of decoding the sample speech signal obtained, an existing trained acoustic model and an existing trained language model can be used for decoding. Usually after decoding, multiple candidate decoding results will be obtained.

In order to improve the accuracy of the recognition result, in exemplary embodiments of the present disclosure, top three candidate decoding results among the candidate decoding results can be extracted as decoding results, so as to reduce the complexity while the accuracy being taken into account.

In actual applications, the top two or top four candidate decoding results can also be extracted according to actual needs, which is not limited in exemplary embodiments of the present disclosure.

A sample speech signal "JINGDONG" is taken as an example, for candidate decoding results, the candidate decoding results may be ranked, according to matching degree, as "JINGDONG", "DingDong", "DiDong", etc. These three words will be used as decoding results to extract the first feature.

In exemplary embodiments of the present disclosure, that the first feature is extracted from the decoding result can specifically include steps of: obtaining the prepositive word information, obtaining an acoustic-model score and a language-model score of the decoding result, and obtaining a normalized acoustic-model score and a normalized language-model score as the first feature by performing normalization on the acoustic-model score and the language-model score. In some embodiments, the score refers to the probability of a word appearing in the decoding result. The higher the probability is, the higher the score is, indicating that the likelihood of recognizing the word is greater.

The first feature containing the normalized acoustic-model score, the normalized language-model score, and the prepositive word information is obtained, and the sample speech signal containing or not containing the prepositive word can be preliminarily characterized through the first feature.

In exemplary embodiments of the present disclosure, performing normalization on the acoustic-model score and the language-model score can specifically include steps of: obtain the normalized acoustic-model score by dividing the acoustic-model score by an acoustic-model score of an optimal decoding result, and obtain the normalized language-model score by dividing the language-model score by a language model score of the optimal decoding result. In some embodiments, the optimal decoding result is a candidate decoding result ranked first among the candidate decoding results. The acoustic-model score and the language-model score can be normalized within a 0-1 range through the normalization performed.

It should be noted that before the first feature is extracted from the decoding result, the speech recognition method provided by exemplary embodiments of the present disclosure also includes determining a sensitive word set Ω={AB, B, AC, C, . . . } containing the prepositive word A, where B and C represent common phrases combined with A. For example, for "not", B and C are usually "in", "be", "right", etc. The first feature is extracted from the decoding result only when the decoding result contains any element of the sensitive word set Ω.

In step S120, a target speech segment is extracted from the sample speech signal, a logarithmic amplitude spectrum of the target speech segment is obtained, and a second feature is determined according to the logarithmic amplitude spectrum, the second feature herein is a two-dimensional time-frequency domain feature of the sample speech signal.

In actual applications, if the decoding result in step S110 contains an element of the sensitive word set Ω, a time starting point and a time ending point corresponding to the element above can be determined according to time information of the decoding result. A speech segment between the time starting point and the time ending point can be extracted, according to corresponding time starting point and time ending point, from the sample speech signal, as the target speech segment, that is, the target speech segment containing the element of the sensitive word set Ω.

In exemplary embodiments of the present disclosure, the target speech segment can be further divided into a preset number t of sub segments, and a short-time Fourier transform is performed on each sub segment regarding a preset number f of points, to obtain a speech spectrogram. In this way, an one-dimensional signal can be transformed into a two-dimensional graph. For example, when t=120 and f=128, the speech spectrogram obtained is a 120*128 two-dimensional graph. A time interval for the target speech segment of a short word is very short, thus after being divided into t sub segments, the signal within each sub segment has stabilized. By using the short-time Fourier transform, the computational efficiency can be improved while meeting resolution requirements.

It should be noted that a frame length, a window type, and a frame shift of the short-time Fourier transform mentioned above need to be consistent with the frame length, the window type, and the frame shift used in decoding, so as to ensure consistency of the information represented by the first and second features extracted.

Next, the logarithmic amplitude spectrum of the speech spectrogram can be depicted. In order to facilitate analysis and calculation, it is necessary to normalize the logarithmic amplitude spectrum to a range of 0 to 1 to obtain a normalized logarithmic amplitude spectrum Y (t, f). Then the second feature is extracted from the normalized logarithmic amplitude spectrum Y (t, f).

In exemplary embodiments of the present disclosure, in a time direction, that the second feature is extracted from the normalized logarithmic amplitude spectrum Y (t, f) can specifically include: the normalized logarithmic amplitude spectrum Y (t, f) is divided into multiple sub bands; and sub band energy of the sub bands is smoothed in the time direction to obtain a value of time-smoothed sub band energy $P_T$ (t, f), as shown in equation (1):

$$P_T(t, f) = \frac{1}{5}\sum_{i=-2}^{2} Y(t+i, f)Y^*(t+i, f) \tag{1}$$

where the value of time-smoothed sub band energy $P_T$ (t, f) is obtained by smoothing the sub band energy at a current time instant with the sub band energy at an adjacent time instant. For example, the value of time-smoothed sub band energy can be obtained by averaging the sub band energy at a current time instant and the sub band energy at an adjacent time instant. The adjacent time instant selected in equation (1) is 2 time instants before and 2 time instants after the current time instant. The sub band energy is a product of conjugate complex numbers Y (t+i, f) and Y* (t+i, j) of the normalized logarithmic amplitude spectrum Y (t, f).

By smoothing above sub band energy, the impact of environmental noise can be suppressed, and more stable characteristic of variation in band energy can be obtained.

In exemplary embodiments of the present disclosure, after the value of time-smoothed sub band energy $P_T$ (t, f) is obtained, a time jump ratio $r_T$ (t, f) of the sub band energy can be calculated according to the value of time-smoothed sub band energy $P_T$ (t, f), as shown in equation (2):

$$r_T(t,f)=P_T(t+5,f)/P_T(t,f) \tag{2}$$

where the time jump ratio $r_T$ (t, f) of the sub band energy is a quotient of the value of time-smoothed sub band energy $P_T$ (t+5, j) corresponding to a preset time instant and the value of time-smoothed sub band energy $P_T$ (t, f) corresponding to the current time instant.

In actual applications, the preset time instant can be determined according to actual situations. For example, the preset time instant is the $5^{th}$ time instant after the current time instant, which is not limited in exemplary embodiments of the present disclosure.

Due to presence of a short time interval between the prepositive word and subsequent words, $P_T$(t, f) will be small when 't' is in the time interval, resulting in a larger time jump ratio. Therefore, by calculating a maximum value of the time jump ratio, it is possible to identify effectively whether the sub band contains the short time interval.

A key feature of the short time interval is that 't' in each sub band is basically equal. Therefore, an average of the time jump ratio $r_T$ (t, f) of the sub band energy of multiple sub bands corresponding to each time instant t can be calculated, to obtain a full-band time jump ratio $$r_T(t) = \frac{1}{F}\sum_{f} r_T(t, f)$$

corresponding to time instant t.

When presence of a short time interval in the short word is determined, an obvious feature is that there is a large value within an extracted time range, which can serve as a reference feature for determining whether there is a prepositive word. In some embodiments, a set of $\{r_T(1), r_T(2), \ldots, r_T(N)\}$ is obtained, where N is the total number of frames, and a statistic is conducted based on above set, so as to obtain {a maximum, an average, a standard deviation}, namely the maximum, the average, and the standard deviation of the time jump ratio. In some embodiments, the maximum, the average, and the standard deviation of the time jump ratio obtained from multiple full-band time jump ratios $r_T$ (t) corresponding to multiple time instants can be used as the second feature.

In some embodiments, in a frequency direction, that second feature is extracted from the normalized logarithmic amplitude spectrum Y (t, f) can specifically include: sub band energy of the sub band is smoothed in the frequency direction to obtain a value of frequency-smoothed sub band energy $P_F$ (t, f), as shown in equation (3):

$$P_F(t, f) = \frac{1}{5}\sum_{i=-2}^{2} Y(t, f + i)Y^*(t, f + i) \tag{3}$$

where the value of frequency-smoothed sub band energy $P_F$ (t,f) is obtained by smoothing the sub band energy at a current frequency with the sub band energy at an adjacent frequency. For example, the value of frequency-smoothed sub band energy can be obtained by averaging the sub band energy at a current frequency and the sub band energy at an adjacent frequency. The adjacent frequency selected in equation (3) is 2 frequencies before and 2 frequencies after the current frequency. The sub band energy is a product of conjugate complex numbers Y (t, f+i) and Y* (t, f+i) of the normalized logarithmic amplitude spectrum Y (t, f).

By smoothing above sub band energy, the impact of environmental noise can be suppressed, and more stable characteristic of variation in band energy can be obtained.

In exemplary embodiments of the present disclosure, after the value of frequency-smoothed sub band energy $P_F$ (t, f) is obtained, a frequency jump ratio $r_F$ (t, f) of the sub band energy can be calculated according to the value of frequency-smoothed sub band energy $P_F$ (t,f), as shown in equation (4):

$$r_F(t,f)=P_F(t,f+5)/P_F(t,f) \tag{4}$$

where the frequency jump ratio $r_F$ (t, f) of the sub band energy is a quotient of the value of frequency-smoothed sub band energy $P_F$ (t, f+5) corresponding to a preset frequency and the value of frequency-smoothed sub band energy $P_F$ (t, j) corresponding to the current frequency.

In actual applications, the preset frequency can be determined according to actual situations. For example, the preset frequency is the $5^{th}$ frequency after the current frequency, which is not limited in exemplary embodiments of the present disclosure.

Due to presence of a short time interval between the prepositive word and subsequent words, when 't' is in the time interval, ability difference between each frequency band is relatively small due to being in a silent area, resulting in a smaller frequency jump ratio $r_F$ (t, f) of the sub band energy. In contrast, in the speech segment, a larger frequency jump ratio $r_F$ (t, f) of the sub band energy will be resulted.

In some embodiments, an average of the frequency jump ratio $r_F$ (t, f) of the sub band energy of multiple sub bands corresponding to each time instant t is calculated, to obtain a full-band frequency jump ratio $$r_F(t) = \frac{1}{F}\sum_{f} r_F(t, f)$$

corresponding to time instant t.

When presence of a short time interval in the short word is determined, another obvious feature is that there is a smaller $r_F$ (t, f). In some embodiments, a set of $\{r_F(1), r_F(2), \ldots, r_F (N)\}$ is obtained, where N is the total number of frames, and a statistic is conducted based on above set, so as to obtain {a minimum, an average, a standard deviation}, namely the minimum, the average, and the standard deviation of the frequency jump ratio. In some embodiments, the minimum, the average, and the standard deviation of the frequency jump ratio obtained from multiple full-band frequency jump ratios $r_F$ (t) corresponding to multiple time instants can be used as the second feature.

According to above embodiments, the second feature, which is the two-dimensional time-frequency domain feature of the sample speech signal, can be obtained, namely the maximum of the time jump ratio, the average of the time jump ratio, the standard deviation of the time jump ratio, the minimum of the frequency jump ratio, the average of the frequency jump ratio, and the standard deviation of the frequency jump ratio.

In step S130, a third feature is obtained by combining the first feature with the second feature.

In exemplary embodiments of the present disclosure, the first feature includes the normalized acoustic-model score, the normalized language-model score, and the prepositive word information. The second feature includes the maximum of the time jump ratio, the average of the time jump ratio, the standard deviation of the time jump ratio, the minimum of the frequency jump ratio, the average of the frequency jump ratio, and the standard deviation of the frequency jump ratio. Above 9 features are combined through splicing to form the third feature. In actual applications, the third feature can be represented in the form of vectors.

In step S140, a trained classifier is obtained by training an untrained classifier using the third feature.

In exemplary embodiments of the present disclosure, an untrained naive Bayes classifier is trained using the third feature to obtain a trained naive Bayes classifier. The naive Bayes classifier can be a naive Bayes classifier based on Gaussian distribution. With requirements for training of the third feature being met, the efficiency of training can be improved due to the low complexity of the naive Bayes classifier, so that the acoustic model and the language model of the speech recognition do not need to be retrained, and the accuracy of the short word recognition can be improved. Specific methods for training will not be elaborated herein.

In step S150, a to-be-recognized third feature of a to-be-recognized speech signal is obtained and is classified using the trained classifier, to determine whether the to-be-recognized third feature contains a prepositive word.

During the recognition, the to-be-recognized speech signal is processed through the same analysis as it is done during the training, to obtain speech parameters, that is, the to-be-recognized third feature. The to-be-recognized third feature is inputted into the trained naive Bayes classifier to obtain a recognition result, that is, whether the to-be-recognized third feature contains the prepositive word.

According to the speech recognition method provided by exemplary embodiments of the present disclosure, the prepositive word information and the two-dimensional time-frequency domain feature are extracted as the third feature of the sample speech signal. The naive Bayes classifier is trained to obtain the trained naive Bayes classifier that can be used for prepositive word recognition. The trained naive Bayes classifier is used to recognize the to-be-recognized speech signal, so as to determine whether the to-be-recognized speech signal contains the prepositive word. As a result, on the one hand, the speech recognition method does not require training of large-scale common corpus, thereby reducing complexity of the algorithm. With requirements for training of the third feature being met, the efficiency of training can be improved due to the low complexity of the naive Bayes classifier, so that the acoustic model and the language model of the speech recognition do not need to be retrained. On the other hand, by proposing a new two-dimensional time-frequency domain feature of the signal, statistical modeling can be carried out in both two directions, a time axis and a frequency axis, of the speech signal. For specific scenarios of short word recognition, the impact of phrase adhesion, environmental noises, and far-field speech in everyday expression can be reduced, thereby improving the accuracy of short word recognition. In addition, exemplary embodiments of the present disclosure provides a speech recognition method with higher accuracy for short words containing prepositive words.

Reference is made to FIG. 2, processes of a speech recognition method provided by exemplary embodiments of the present disclosure will be explained In step S201, a sample speech signal is obtained. In step S202, a decoding result is obtained by decoding the sample speech signal. In step S203, a determination condition is examined, to determine whether the decoding result contains any element in the sensitive word set which contains prepositive words; if not, that is, it is determined that the decoding result does not contain any element in the sensitive word set, the process is ended, and if yes, that is, it is determined that the decoding result contains any element in the sensitive word set, the process goes to steps S204-S205. In step S204, a first feature is extracted from the decoding result. In step S205, a time starting point and a time ending point, which can be abbreviated as time start end points, corresponding to the element in the sensitive word set are determined. In step S206, a target speech segment is obtained based on the time start end points. In step S207, a logarithmic amplitude spectrum is obtained by performing a short-time Fourier transform on the target speech segment. In step S208, a normalized logarithmic amplitude spectrum is obtained by normalizing the logarithmic amplitude spectrum. In step S209, a two-dimensional time-frequency domain feature is obtained from the normalized logarithmic amplitude spectrum as a second feature. In step S210, a third feature is obtained by combining the first feature with the second feature. In step S211, a trained naive Bayes classifier is obtained by training an untrained naive Bayes classifier using the third feature. In step S212, a to-be-recognized third feature of a to-be-recognized speech signal is classified using the trained naive Bayes classifier, to determine whether the to-be-recognized third feature contains the prepositive word, that is, to determine whether the to-be-recognized speech signal contains prepositive word.

Figure 3:
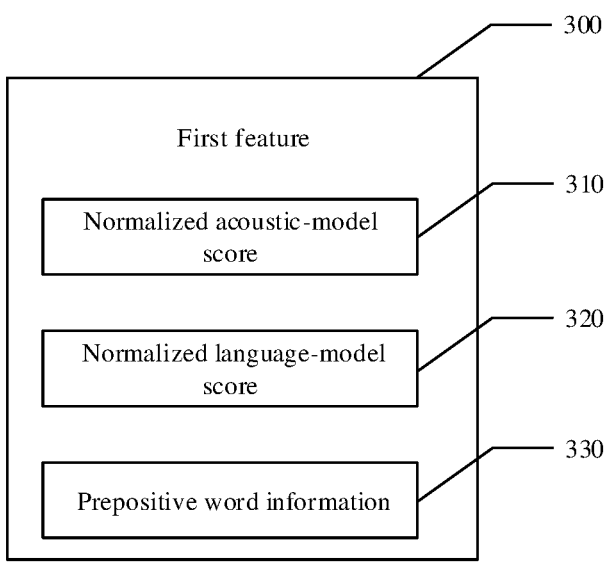
FIG. 3 schematically illustrates a block diagram of a first feature in a speech recognition method according to exemplary embodiments of the present disclosure.
Figure 4:
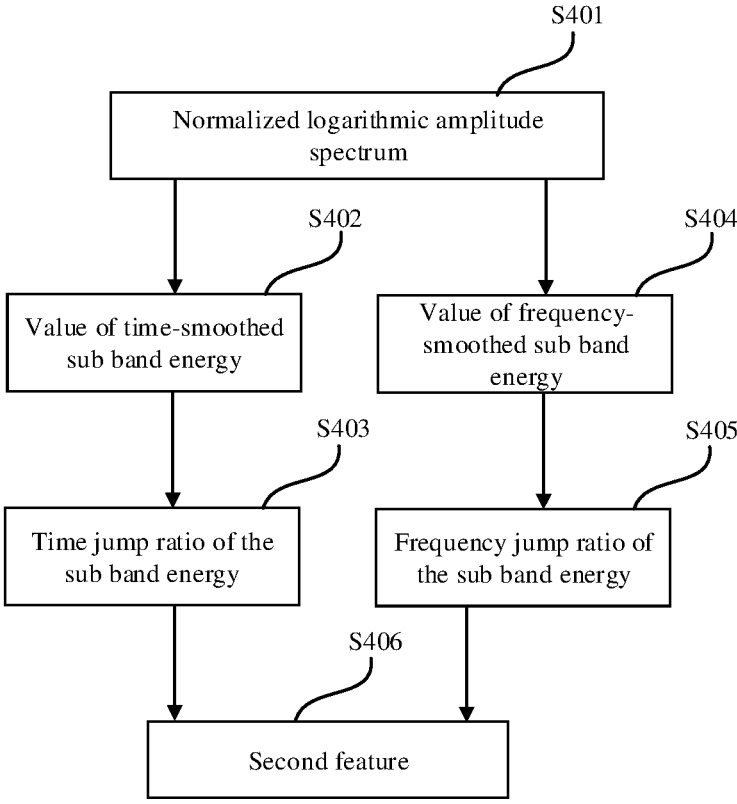
FIG. 4 schematically illustrates a flowchart of steps for obtaining a second feature in a speech recognition method according to exemplary embodiments of the present disclosure.

As shown in FIG. 3, a first feature 300 includes a normalized acoustic-model score 310, a normalized language-model score 320, and prepositive word information 330. FIG. 4 shows a process of obtaining the two-dimensional time-frequency domain feature from the normalized logarithmic amplitude spectrum as the second feature, that is, a process of obtaining the second feature.

In step S401, a normalized logarithmic amplitude spectrum is obtained. In step S402, a value of time-smoothed sub band energy is obtained from the normalized logarithmic amplitude spectrum. In step S403, a time jump ratio of the sub band energy is calculated according to the value of time-smoothed sub band energy. In step S404, a value of frequency-smoothed sub band energy is obtained from the normalized logarithmic amplitude spectrum. In step S405, a frequency jump ratio of the sub band energy is calculated according to the value of frequency-smoothed sub band energy. In step S406, a maximum of the time jump ratio, an average of the time jump ratio, and a standard deviation of the time jump ratio are obtained from the time jump ratio of the sub band energy, and a minimum of the frequency jump ratio, an average of the frequency jump ratio, and a standard deviation of the frequency jump ratio are obtained from the frequency jump ratio of the sub band energy, as the second feature.

It should be noted that although various steps of the method of the present disclosure are described in a specific order in the drawings, this does not require or imply that these steps must be executed in that specific order, or that all of the steps shown must be executed in order to achieve desired results. Additionally or alternatively, some steps can be omitted, multiple steps can be merged into one step for execution, and/or one step can be split into multiple steps for execution.

Furthermore, in some exemplary embodiments, a speech recognition apparatus is also provided.

Figure 5:
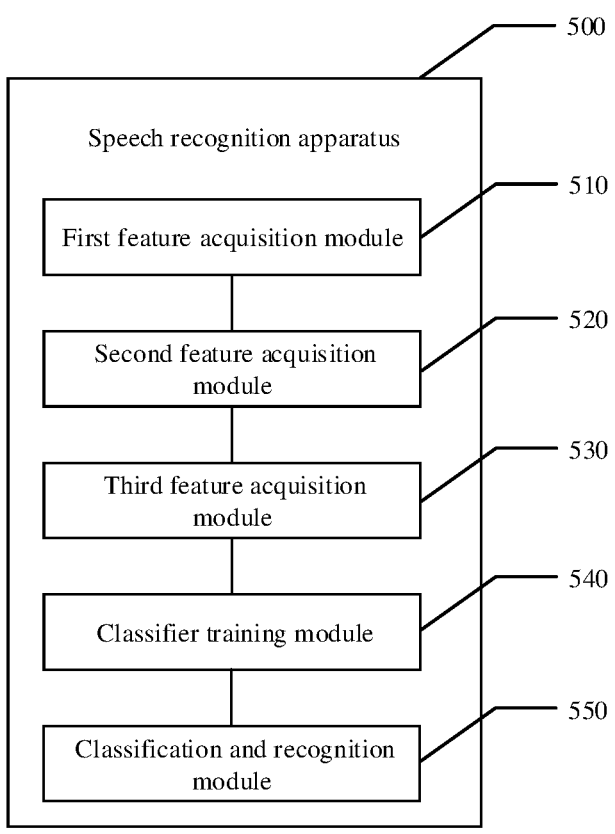
FIG. 5 schematically illustrates a block diagram of a speech recognition apparatus according to exemplary embodiments of the present disclosure.

FIG. 5 schematically illustrates a block diagram of a speech recognition apparatus according to exemplary embodiments of the present disclosure. Referring to FIG. 5, the speech recognition apparatus 500 according to exemplary embodiments of the present disclosure can include a first feature acquisition module 510, a second feature acquisition module 520, a third feature acquisition module 530, a classifier training module 540, and a classification and recognition module 550.

In some embodiments, the first feature acquisition module 510 is configured to obtain a sample speech signal, obtain a decoding result by decoding the sample speech signal, and extract a first feature from the decoding result, wherein the first feature contains prepositive word information of the sample speech signal. The second feature acquisition module 520 is configured to extract a target speech segment from the sample speech signal, obtain a logarithmic amplitude spectrum of the target speech segment, and determine a second feature according to the logarithmic amplitude spectrum, wherein the second feature is a two-dimensional time-frequency domain feature of the sample speech signal. The third feature acquisition module 530 is configured to obtain a third feature by combining the first feature with the second feature. The classifier training module 540 is configured to obtain a trained classifier by training an untrained classifier using the third feature. The classification and recognition module 550 is configured to obtain a to-be-recognized third feature of a to-be-recognized speech signal, and classify the to-be-recognized third feature using the trained classifier, to determine whether the to-be-recognized third feature contains the prepositive word.

Various functional modules of the speech recognition apparatus in embodiments of the present disclosure will not be repeated herein due to they are the same as those in aforementioned method embodiments.

According to descriptions of above method embodiments, it is easy for those skilled in the art to understand that the exemplary method embodiments described herein can be implemented through software or through combination of software and necessary hardware. Therefore, the technical solutions according to embodiments of the present disclosure can be embodied in the form of a software product, which can be stored on a non-volatile storage medium (such as CD-ROM, USB drive, mobile hard drive, etc.) or on a network, including several instructions to enable a computing device (such as a personal computer, a server, a terminal device, or a network device, etc.) to execute the methods according to embodiments of the present disclosure.

In addition, the above drawings are only a schematic explanation of processes included in the methods according to exemplary embodiments disclosed in the present disclosure, and are not for the purpose of limitation. It is easy to understand that the processes shown in above figures do not indicate or limit an order of these processes. In addition, it is also easy to understand that these processes can be executed, for example, through multiple modules synchronously or asynchronously.

It should be noted that although several modules or units of the apparatus provided for action execution are mentioned in above descriptions in detail, such division of modules is not mandatory. In fact, according to embodiments disclosed in the present disclosure, the features and functions of two or more modules or units described above can be embodied in one module or unit. On the contrary, the features and functions of one module or unit described above can be further divided into multiple modules or units for implementation.

In exemplary embodiments of the present disclosure, an electronic device capable of implementing above methods is also provided.

Those skilled in the art can understand that various aspects of the present disclosure can be implemented as systems, methods, or program products. Therefore, various aspects of the present disclosure can be specifically implemented in the following forms: the complete hardware implementation, the complete software implementation (including firmware, microcode, etc.), or a combination of hardware and software implementations, which can be collectively referred to as "circuit", "module", or "system".

An electronic device 600 according to embodiments of the present disclosure will be described below with reference to FIG. 6. The electronic device 600 shown in FIG. 6 is only an example and should not impose any limitations on the functionality and scope of use of the embodiments of the present disclosure.

Figure 6:
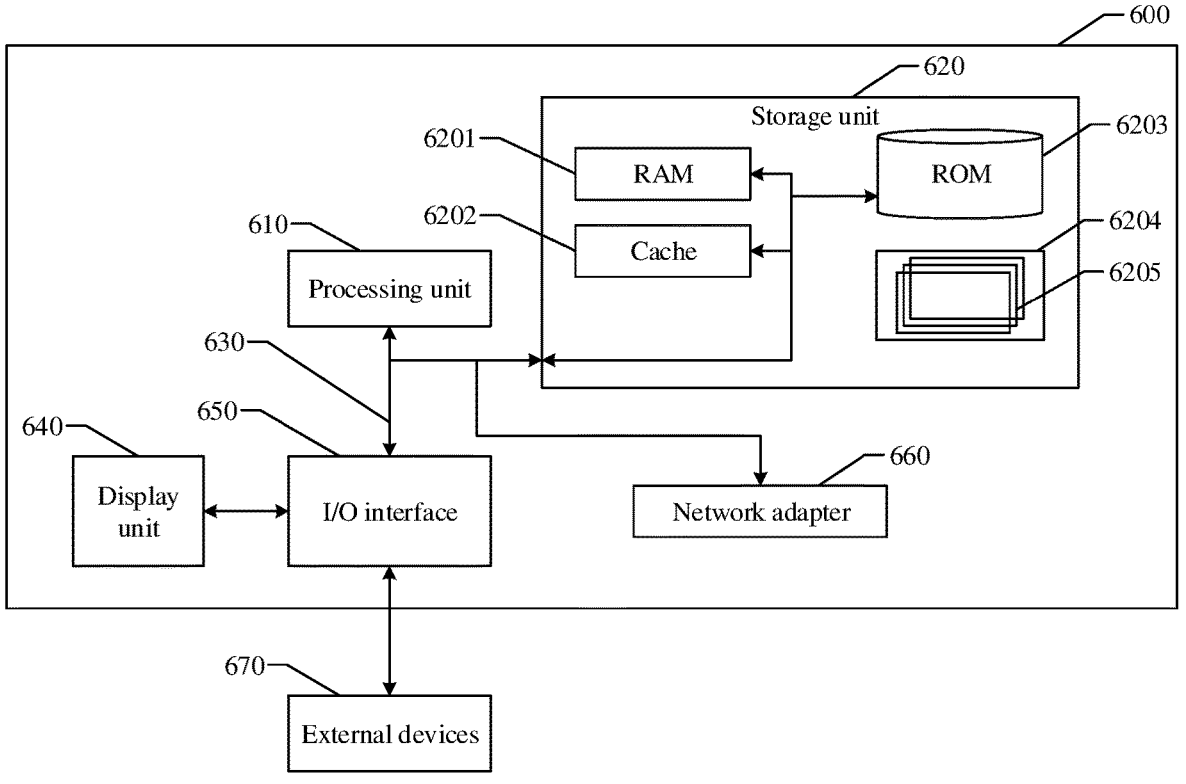
FIG. 6 schematically illustrates a module diagram of an electronic device according to exemplary embodiments of the present disclosure.

As shown in FIG. 6, the electronic device 600 is represented in the form of a universal computing device. The components of electronic device 600 may include but are not limited to at least one processing unit 610, at least one storage unit 620, a bus 630 connecting different system components (including storage unit 620 and processing unit 610), and a display unit 640.

In some embodiments, the storage unit 620 stores program codes, which can be executed by the processing unit 610, causing the processing unit 610 to execute steps described in "exemplary methods" according to various exemplary embodiments of the present disclosure. For example, the processing unit 610 can perform steps as shown in FIG. 1, including step S110, a sample speech signal is obtained, a decoding result is obtained by decoding the sample speech signal, and a first feature is extracted from the decoding result, the first feature herein contains prepositive word information of the sample speech signal; step S120, a target speech segment is extracted from the sample speech signal, a logarithmic amplitude spectrum of the target speech segment is obtained, and a second feature is determined according to the logarithmic amplitude spectrum, the second feature herein is a two-dimensional time-frequency domain feature of the sample speech signal; step S130, a third feature is obtained by combining the first feature with the second feature; step S140, a trained classifier is obtained by training an untrained classifier using the third feature; and step S150, a to-be-recognized third feature of a to-be-recognized speech signal is obtained and is classified using the trained classifier, to determine whether the to-be-recognized third feature contains a prepositive word.

The storage unit 620 may include a readable medium in the form of a volatile storage unit, such as a random access storage unit (RAM) 6201 and/or a cache storage unit 6202, and may further include a read-only storage unit (ROM) 6203.

The storage unit 620 may further include a program/utility tool 6204 with a (at least one) set of program modules 6205, such as but not limited to an operating system, one or more application programs, other program modules, and program data, each or some combination of which may include an implementation of a network environment.

The bus 630 can represent one or more types of bus structures, including storage unit buses or storage unit controllers, peripheral buses, graphics acceleration ports, processing units, or local area buses using any of various bus structures.

The electronic device 600 can also communicate with one or more external devices 670 (such as a keyboard, a pointing device, a Bluetooth device, etc.), and can also communicate with one or more devices that enable users to interact with electronic device 600, and/or with any device that enables electronic device 600 to communicate with one or more other computing devices (such as a router, a modem, etc.). The communication can be carried out through an input/output (I/O) interface 650. Moreover, electronic device 600 can also communicate with one or more networks (such as a local area network (LAN), a wide area network (WAN), and/or a public network, such as the Internet) through a network adapter 660. As shown in the figure, the network adapter 660 communicates with other modules of electronic device 600 through the bus 630. It should be understood that although not shown in the figure, other hardware and/or software modules can be used in conjunction with electronic device 600, including but not limited to microcodes, device drivers, redundant processing units, external disk drive arrays, RAID systems, tape drives, and data backup storage systems.

According to descriptions of above method embodiments, it is easy for those skilled in the art to understand that the exemplary method embodiments described herein can be implemented through software or through combination of software and necessary hardware. Therefore, the technical solutions according to embodiments of the present disclosure can be embodied in the form of a software product, which can be stored on a non-volatile storage medium (such as CD-ROM, USB drive, mobile hard drive, etc.) or on a network, including several instructions to enable a computing device (such as a personal computer, a server, a terminal device, or a network device, etc.) to execute the methods according to embodiments of the present disclosure.

In exemplary embodiments of the present disclosure, a computer-readable storage medium is also provided, on which a program product capable of implementing the methods described in the present disclosure is stored. In some embodiments, various aspects of the present disclosure can also be implemented in the form of a program product, which includes program codes used to cause the terminal device to perform steps described in "exemplary methods" according to various exemplary embodiments of the present disclosure when the program product is running on the terminal device.

Figure 7:
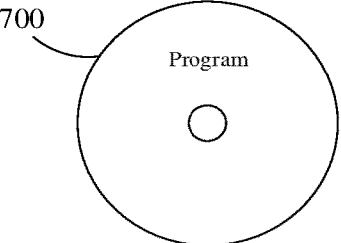
FIG. 7 schematically illustrates a schematic diagram of a program product according to exemplary embodiments of the present disclosure.

Referring to FIG. 7, a program product 700 for implementing above method according to the embodiments of the present disclosure is shown. The program product 900 can be a portable compact disk read only memory (CD-ROM) including program codes, and can be run on a terminal device, such as running on a personal computer. However, the program product of the present disclosure is not limited thereto. In the present disclosure, a readable storage medium may be any tangible medium that contains or stores a program, and the program can be used by or in conjunction with an instruction execution system, apparatus, or device.

The program product may be any combination of one or more readable media. The readable medium may be a readable signal medium or a readable storage medium. The readable storage medium may be, for example, but not limited to, an electrical, magnetic, optical, electromagnetic, infrared, or semiconductor system, apparatus or device, or a combination of any of the above. More specific examples (non-exhaustive list) of readable storage media include, electrical connections with one or more wires, portable disks, hard disks, random access memory (RAM), read only memory (ROM), erasable programmable read only memory (EPROM or flash), optical fiber, portable compact disk read only memory (CD-ROM), optical storage devices, magnetic storage devices, or any suitable combination of the above.

A computer readable signal medium may include a propagated data signal in a baseband or as part of a carrier wave with readable program codes embodied thereon. Such propagated data signals may take a variety of forms, including but not limited to electromagnetic signals, optical signals, or any suitable combination of the above. A readable signal medium may also be any readable medium other than a readable storage medium that can transmit, propagate, or transport the program used by or in connection with the instruction execution system, apparatus, or device.

Program codes embodied on a readable medium may be transmitted using any suitable medium, including but not limited to wireless, wireline, optical fiber cable, RF, etc., or any suitable combination of the above.

Program codes for carrying out operations of the present disclosure may be written in any combination of one or more programming languages, including object-oriented programming languages, such as Java, C++, etc., as well as conventional procedural programming languages, such as "C" language or similar programming languages. The program codes may be executed entirely on a user's computing device, partly on the user's device, as a stand-alone software package, partly on the user's computing device and partly on a remote computing device, or entirely on the remote computing device or a server. Where the remote computing device is involved, the remote computing device may be connected to the user's computing device over any kind of network, including a local area network (LAN) or a wide area network (WAN), or may be connected to an external computing device (e.g., connected via the Internet with the help of an Internet Service Provider).

In addition, the above drawings are only a schematic explanation of processes included in the methods according to exemplary embodiments disclosed in the present disclosure, and are not for the purpose of limitation. It is easy to understand that the processes shown in above figures do not indicate or limit an order of these processes. In addition, it is also easy to understand that these processes can be executed, for example, through multiple modules synchronously or asynchronously.

After considering and practicing the content disclosed in the present disclosure, those skilled in the art will easily come up with other embodiments of the present disclosure. The present disclosure is intended to cover any variations, uses, or adaptations of the present disclosure, which follow the general principles of the present disclosure and include common knowledge or commonly used technical means in the art that are not disclosed in the present disclosure. The specification and embodiments are only considered exemplary, and a true scope and spirit of the present disclosure are indicated by claims.

It should be understood that the present disclosure is not limited to precise structures already described above and shown in the drawings, and various modifications and changes can be made without departing from the scope of the present disclosure, which is limited only by the appended claims.

What is claimed is:

1. A speech recognition method, comprising:
   obtaining a to-be-recognized speech signal, obtaining a decoding result by decoding the to-be-recognized speech signal, and extracting a first feature from the decoding result, wherein the first feature contains pre-positive word information of the to-be-recognized speech signal;

extracting a target speech segment from the to-be-recognized speech signal, obtaining a logarithmic amplitude spectrum of the target speech segment, and determining a second feature according to the logarithmic amplitude spectrum, wherein the second feature is a two-dimensional time-frequency domain feature of the to-be-recognized speech signal;

obtaining a third feature by combining the first feature with the second feature; and classifying the third feature using a trained classifier, to determine whether the third feature contains a prepositive word;

wherein a frame length, a window type, and a frame shift used in decoding the to-be-recognized speech signal are the same as a frame length, a window type, and a frame shift used in obtaining the logarithmic amplitude spectrum of the target speech segment.

2. The method according to claim 1, wherein obtaining the decoding result by decoding the to-be-recognized speech signal comprises:

decoding the to-be-recognized speech signal using a trained acoustic model and a trained language model, and extracting top three candidate decoding results among candidate decoding results as the decoding result.

3. The method according to claim 2, wherein extracting the first feature from the decoding result comprises:

obtaining an acoustic-model score and a language-model score of the decoding result, and obtaining a normalized acoustic-model score and a normalized language-model score as the first feature by performing normalization on the acoustic-model score and the language-model score.

4. The method according to claim 3, wherein obtaining the normalized acoustic-model score and the normalized language-model score by performing normalization on the acoustic-model score and the language-model score comprises:

obtaining the normalized acoustic-model score by dividing the acoustic-model score by an acoustic-model score of an optimal decoding result, wherein the optimal decoding result is a candidate decoding result ranked first among the candidate decoding results; and obtaining the normalized language-model score by dividing the language-model score by a language-model score of the optimal decoding result.

5. The method according to claim 1, wherein determining the prepositive word information as 1 in response to containing of the prepositive word in the decoding result; and determining the prepositive word information as 0 in response to not containing of the prepositive word in the decoding result.

6. The method according to claim 5, wherein the prepositive word is at least one of "no" or "not".

7. The method according to claim 1, further comprising:

determining a sensitive word set containing the prepositive word, and extracting the first feature from the decoding result in response to containing of any element in the sensitive word set in the decoding result.

8. The method according to claim 7, wherein extracting the target speech segment from the to-be-recognized speech signal comprises:

determining a time starting point and a time ending point corresponding to the element according to time information of the decoding result; and extracting a speech segment between the time starting point and the time ending point from the to-be-recognized speech signal as the target speech segment.

9. The method according to claim 1, wherein obtaining the logarithmic amplitude spectrum of the target speech segment comprises:

dividing the target speech segment into a preset number of sub segments;

obtaining a speech spectrogram by performing a short-time Fourier transform on each of the sub segments regarding a preset number of points; and obtaining the logarithmic amplitude spectrum according to the speech spectrogram.

10. The method according to claim 9, wherein determining the second feature according to the logarithmic amplitude spectrum comprises:

obtaining a normalized logarithmic amplitude spectrum by normalizing the logarithmic amplitude spectrum to a range of 0 to 1; and extracting the second feature from the normalized logarithmic amplitude spectrum.

11. The method according to claim 10, wherein extracting the second feature from the normalized logarithmic amplitude spectrum comprises:

dividing the normalized logarithmic amplitude spectrum into multiple sub bands;

obtaining values of time-smoothed sub band energy by smoothing sub band energy of the sub bands in a time direction;

calculating time jump ratios of the sub band energy according to the values of time-smoothed sub band energy;

obtaining a full-band time jump ratio corresponding to a time instant by averaging the time jump ratios of the sub band energy of the multiple sub bands corresponding to the time instant;

obtaining a maximum of the time jump ratio, an average of the time jump ratio, and a standard deviation of the time jump ratio from multiple full-band time jump ratios corresponding to multiple time instants as the second feature;

obtaining values of frequency-smoothed sub band energy by smoothing sub band energy of the sub bands in a frequency direction;

calculating frequency jump ratios of the sub band energy according to the values of frequency-smoothed sub band energy;

obtaining a full-band frequency jump ratio corresponding to a time instant by averaging the frequency jump ratios of the sub band energy of the multiple sub bands corresponding to the time instant; and obtaining a minimum of the frequency jump ratio, an average of the frequency jump ratio, and a standard deviation of the frequency jump ratio from multiple full-band frequency jump ratios corresponding to multiple time instants as the second feature.

12. The method according to claim 11, wherein obtaining the values of the time-smoothed sub band energy by smoothing the sub band energy of the sub bands in the time direction comprises:

obtaining the values of time-smoothed sub band energy by averaging the sub band energy at a current time instant and the sub band energy at an adjacent time instant; and wherein obtaining values of frequency-smoothed sub band energy by smoothing sub band energy of the sub bands in a frequency direction comprises:

obtaining the values of frequency-smoothed sub band energy by averaging the sub band energy at a current frequency and the sub band energy at an adjacent frequency.

13. The method according to claim 11, wherein calculating the time jump ratios of the sub band energy according to the values of the time-smoothed sub band energy comprises:

obtaining quotients of a value of time-smoothed sub band energy corresponding to a preset time instant and a value of time-smoothed sub band energy corresponding to a current time instant as the time jump ratios of the sub band energy; and wherein calculating frequency jump ratios of the sub band energy according to the values of frequency-smoothed sub band energy comprises:

obtaining quotients of a value of frequency-smoothed sub band energy corresponding to a preset frequency and a value of frequency-smoothed sub band energy corresponding to a current frequency as the frequency jump ratios of the sub band energy.

14. The method according to claim 13, wherein the preset time instant is a 5th time instant after the current time instant, and the preset frequency is a 5th frequency after the current frequency.

15. An electronic device, comprising:

a processor; and a memory for storing one or more programs, wherein when the one or more programs are executed by the processor, the processor is configured to obtain a to-be-recognized speech signal, obtain a decoding result by decoding the to-be-recognized speech signal, and extract a first feature from the decoding result, wherein the first feature contains prepositive word information of the to-be-recognized speech signal;

extract a target speech segment from the to-be-recognized speech signal, obtain a logarithmic amplitude spectrum of the target speech segment, and determine a second feature according to the logarithmic amplitude spectrum, wherein the second feature is a two-dimensional time-frequency domain feature of the to-be-recognized speech signal;

obtain a third feature by combining the first feature with the second feature; and classify the third feature using a trained classifier, to determine whether the third feature contains a prepositive word;

wherein a frame length, a window type, and a frame shift used in decoding the to-be-recognized speech signal are the same as a frame length, a window type, and a frame shift used in obtaining the logarithmic amplitude spectrum of the target speech segment.

16. A method for training a classifier, comprising:

obtaining a sample speech signal, obtaining a decoding result by decoding the sample speech signal, and extracting a first feature from the decoding result, wherein the first feature contains prepositive word information of the sample speech signal;

extracting a target speech segment from the sample speech signal, obtaining a logarithmic amplitude spectrum of the target speech segment, and determining a second feature according to the logarithmic amplitude spectrum, wherein the second feature is a two-dimensional time-frequency domain feature of the sample speech signal;

obtaining a third feature by combining the first feature with the second feature; and training an untrained classifier using the third feature, to obtain a trained classifier;

wherein a frame length, a window type, and a frame shift used in decoding the sample speech signal are the same as a frame length, a window type, and a frame shift used in obtaining the logarithmic amplitude spectrum of the target speech segment.

17. The method according to claim 16, wherein extracting the first feature from the decoding result comprises:

obtaining an acoustic-model score and a language-model score of the decoding result, and obtaining a normalized acoustic-model score and a normalized language-model score as the first feature by performing normalization on the acoustic-model score and the language-model score.

18. The method according to claim 16, wherein determining the second feature according to the logarithmic amplitude spectrum comprises:

dividing the target speech segment into a preset number of sub segments;

obtaining a speech spectrogram by performing a short-time Fourier transform on each of the sub segments regarding a preset number of points;

obtaining the logarithmic amplitude spectrum according to the speech spectrogram, obtaining a normalized logarithmic amplitude spectrum by normalizing the logarithmic amplitude spectrum to a range of 0 to 1; and extracting the second feature from the normalized logarithmic amplitude spectrum.

19. The method according to claim 18, wherein extracting the second feature from the normalized logarithmic amplitude spectrum comprises:

dividing the normalized logarithmic amplitude spectrum into multiple sub bands;

obtaining values of time-smoothed sub band energy by smoothing sub band energy of the sub bands in a time direction;

calculating time jump ratios of the sub band energy according to the values of time-smoothed sub band energy;

obtaining a full-band time jump ratio corresponding to a time instant by averaging the time jump ratios of the sub band energy of the multiple sub bands corresponding to the time instant;

obtaining a maximum of the time jump ratio, an average of the time jump ratio, and a standard deviation of the time jump ratio from multiple full-band time jump ratios corresponding to multiple time instants as the second feature;

obtaining values of frequency-smoothed sub band energy by smoothing sub band energy of the sub bands in a frequency direction;

calculating frequency jump ratios of the sub band energy according to the values of frequency-smoothed sub band energy;

obtaining a full-band frequency jump ratio corresponding to a time instant by averaging the frequency jump ratios of the sub band energy of the multiple sub bands corresponding to the time instant; and obtaining a minimum of the frequency jump ratio, an average of the frequency jump ratio, and a standard deviation of the frequency jump ratio from multiple full-band frequency jump ratios corresponding to multiple time instants as the second feature.

20. The method according to claim 16, wherein training the untrained classifier using the third feature, to obtain the trained classifier comprises:

training an untrained naive Bayes classifier using the third feature, to obtain a trained naive Bayes classifier.

\* \* \* \* \*